Aug. 13, 1963   J. H. GORDON   3,100,366
SCREW CAP ASSEMBLING HEAD
Filed June 16, 1961   5 Sheets-Sheet 1 to fig.1a

INVENTOR.
JAMES HENRY GORDON
BY Clyde H. Haynes
George W. Reiter
ATTORNEYS

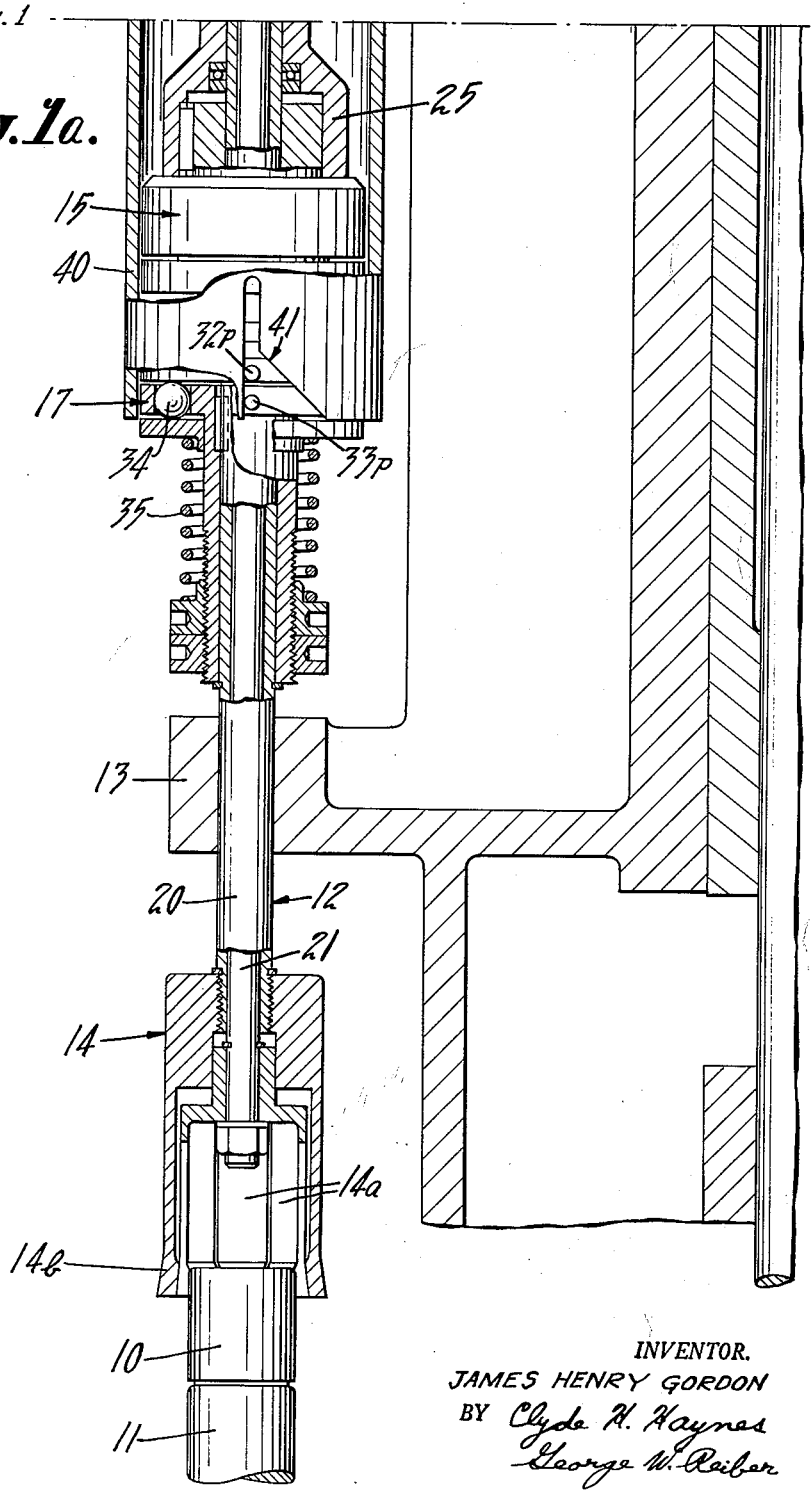

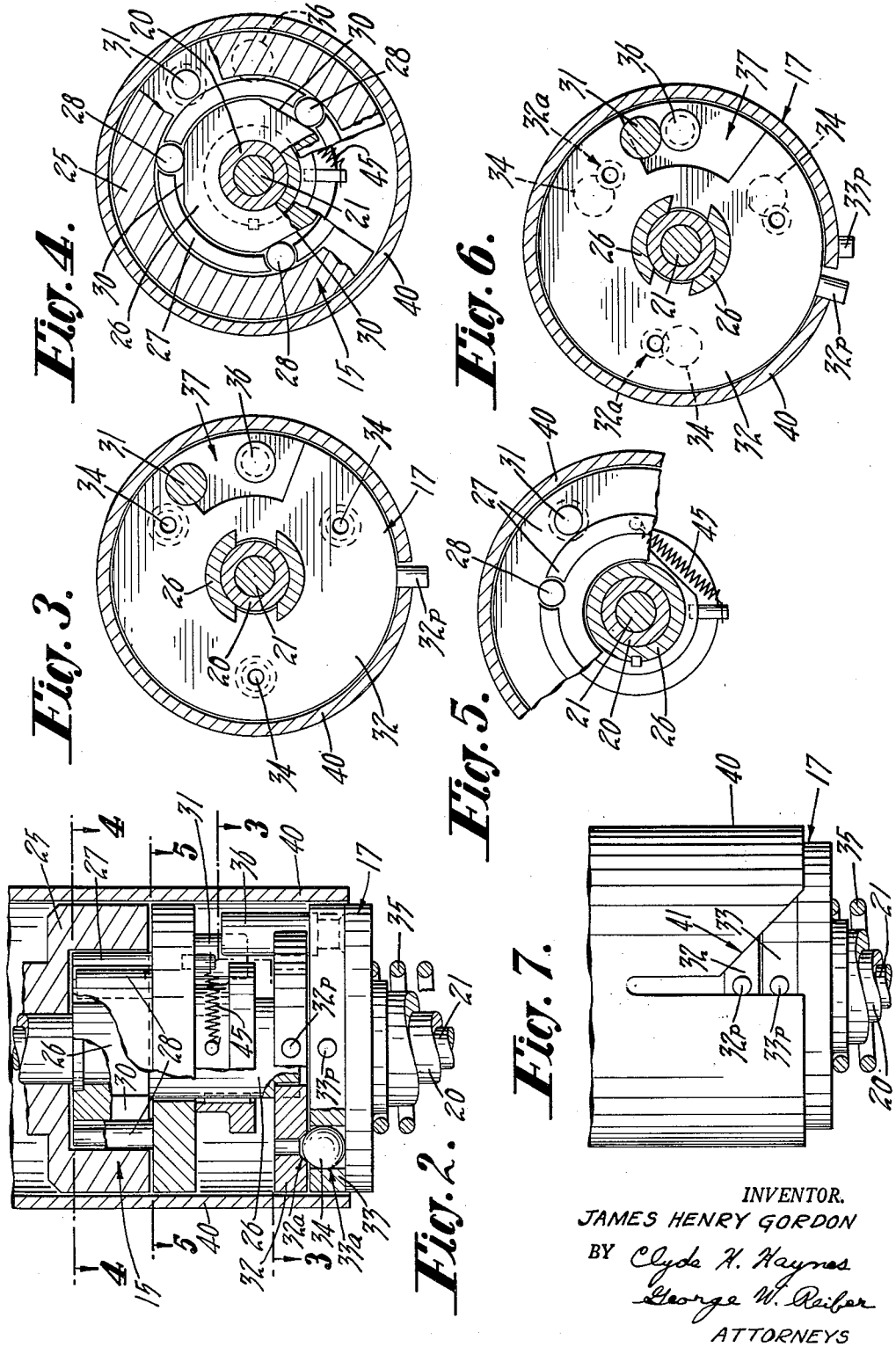

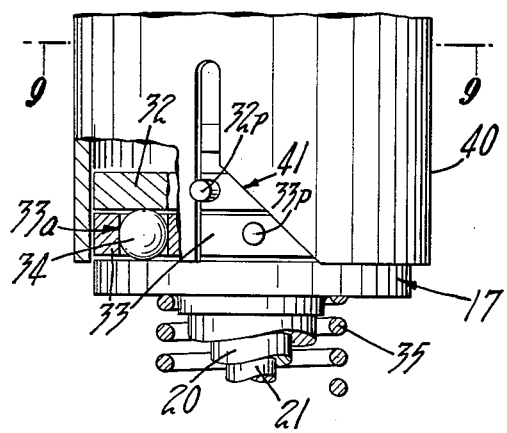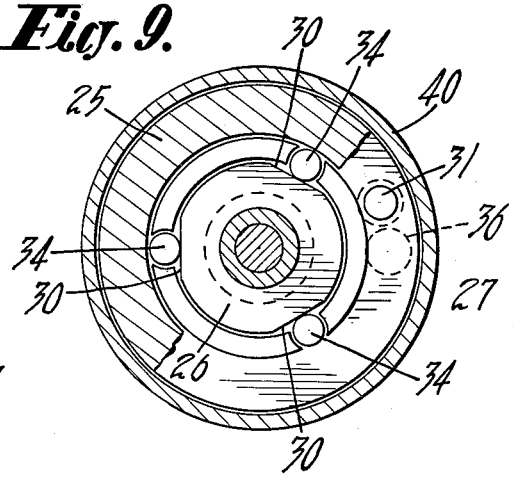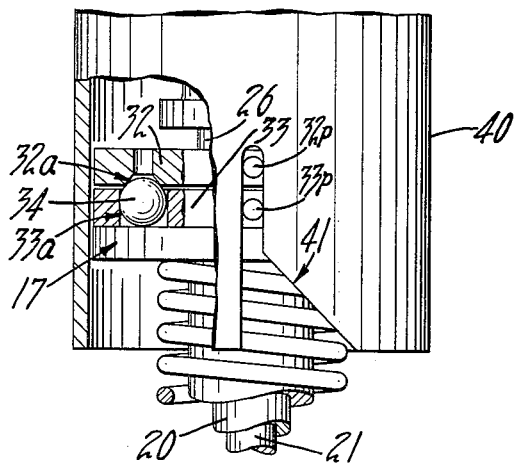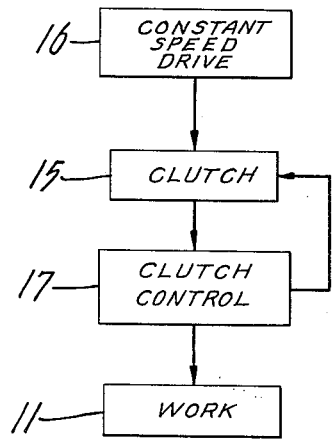

Aug. 13, 1963  J. H. GORDON  3,100,366
SCREW CAP ASSEMBLING HEAD
Filed June 16, 1961  5 Sheets-Sheet 5
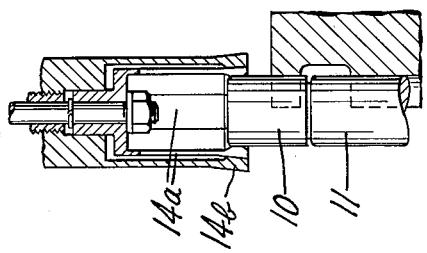
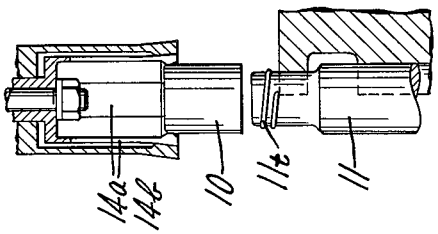
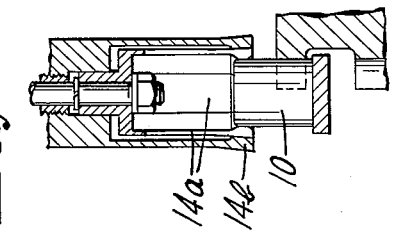
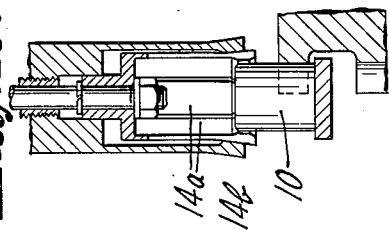
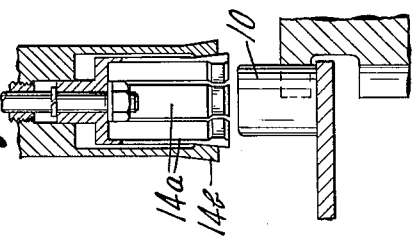
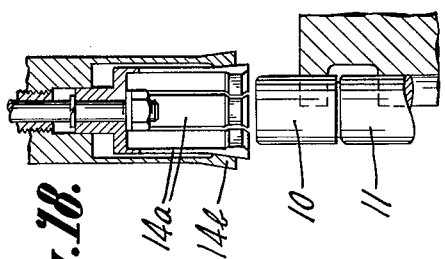
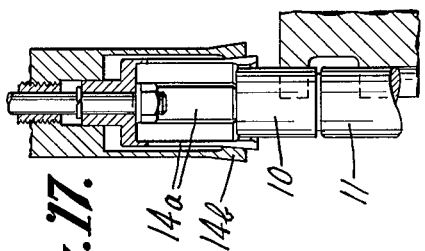
INVENTOR.
JAMES HENRY GORDON
BY Clyde K. Haynes
George W. Reiber
ATTORNEYS

United States Patent Office 3,100,366
Patented Aug. 13, 1963

3,100,366
SCREW CAP ASSEMBLING HEAD
James Henry Gordon, West Orange, N.J., assignor to American Can Company, New York, N.Y., a corporation of New Jersey
Filed June 16, 1961, Ser. No. 117,729
5 Claims. (Cl. 53—317)

This invention relates to an apparatus for applying screw caps to threaded bottles and the like.

One of the objects of the present invention is to provide structure which will screw a cap on a bottle until a predetermined torque limit is reached during the assembly and then release itself so as to avoid breaking the cap or the bottle.

A further object of the invention is to provide a torque limiting clutch arrangement on a spindle capable of disengaging when the torque reaches a predetermined limit.

A further object of the present invention is to provide a clutch between a constant speed drive and the work and a clutch control in series between the clutch and the work to control engagement of the clutch, the clutch control being responsive to the torque transmitted through the clutch to the work.

Numerous other objects and advantages of the invention will be apparent as it is better understood from the following description, which, taken in connection with the accompanying drawings, discloses a preferred embodiment thereof.

FIGURES 1 and 1a when combined are an elevational view in section of a bottle capper incorporating my invention.

FIG. 2 is a fragmentary enlargement in section illustrating the torque limiting clutch and clutch control.

FIG. 3 is a view taken along the line 3—3 of FIG. 2;

FIG. 4 is a view taken along the line 4—4 of FIG. 2;

FIG. 5 is a fragmentary view taken along the line 5—5 of FIG. 2;

FIG. 6 is a sectional view similar to FIG. 3 but showing the clutch control and clutch parts in a different position relative to each other from that of FIG. 3;

FIG. 7 is a fragmentary enlarged elevational view of part of the clutch and clutch control of FIG. 1a during transmission of torque between the constant speed drive and work;

FIG. 8 is a fragmentary enlarged elevational view with parts broken away and other parts in cross section illustrating the position of the clutch control immediately after a torque limit has been reached and transmission of power between the constant speed drive and the work has ceased;

FIG. 9 is a sectional view taken along the line 9—9 of FIG. 8;

FIG. 10 is an elevational view partly in section illustrating resetting of the clutch and clutch control after the cap has been screwed on the bottle;

FIG. 11 is a schematic diagram of a control speed drive driving work through a clutch control by a clutch control.

Figure 1:
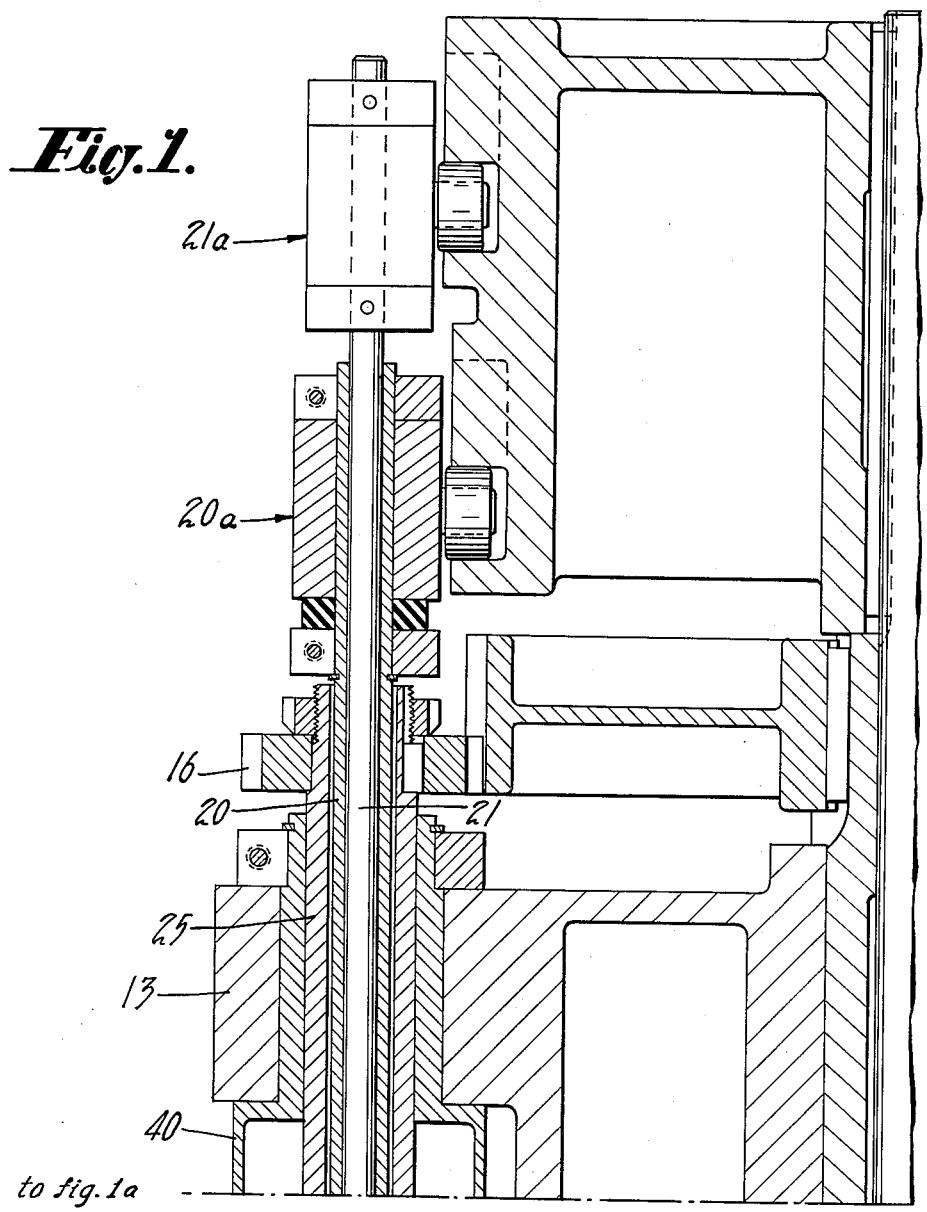

FIGURES 12 to 18 inclusive illustrate the sequence of operations performed by the machine of FIGURES 1 and 1a wherein in FIG. 12 the collar and cap are positioned so that the collar may be lowered over the cap (FIG. 13) with the collar gripping the cap in FIG. 14 and aligning the cap and the bottle in FIG. 15 so that the cap may be turned relative to the bottle to screw the cap on the bottle as in FIG. 16 followed by a termination of the screwing of the cap on the bottle and a release of the collet from the cap as in FIG. 17, and discharging the bottle and resetting the collet for another cycle of operation as in FIG. 18.

As previously set forth the purpose of the present machine is to screw a cap 10 on a bottle 11 without breaking the cap or the bottle. The device comprises essentially a constant speed drive spindle 12 journaled in a supporting structure 13 and supporting at the lower end thereof a collet 14 for engaging the cap 10. The spindle 12 is rotated through a clutch 15 by means of a constant speed drive 16, the clutch 15 being controlled by a clutch control 17.

Spindle 12 includes a rotary drive sleeve 20 and an inner shaft 21 freely rotatable and reciprocably rotated therein. Drive sleeve 20 is moved axially and relative to supporting structure 13 by means of a supporting camming device 20a the details of which are not described herein because camming devices for this purpose are commonly used in the industry and because the exact style and design of camming device used is incidental to the operation of the present invention so long as it performs the function of moving drive sleeve 20 axially thereof and relative to supporting structure 13. Inner shaft 21 is moved axially and relative to supporting structure 13 by means of a supporting camming device 21a the details of which are not described herein because camming devices for this purpose are commonly used in the industry and because the exact style and design of camming device used is incidental to the operation of the present invention so long as it performs the function of moving inner shaft 21 axially thereof and relative to supporting structure 13. In addition, camming device 21a moves inner shaft 21 axially relative to drive sleeve 20. The reason for the axial movements of drive sleeve 20 and inner shaft 21 by the cams 20a and 21a becomes apparent when it is recognized that the lower ends of inner shaft 21 and drive sleeve 20 support the inner and outer fingers 14a and 14b respectively of collet 14 which grips cap 10. Collet 14 is a standard collet in which relative movement between its inner fingers 14a and outer fingers 14b in an axial direction causes a releasing and gripping of the inner fingers on the cap.

Drive sleeve 20 and inner shaft 21 are operatively connected through clutch control 17 and clutch 15 in series through drive 16 as schematically illustrated in FIG. 11 and fully illustrated in the detailed illustrations, FIGURES 1–10 inclusive. The clutch 15 in this instance is a standard roller bearing type clutch commonly used as a single revolution clutch which automatically disengages the driving power from the machine. Referring to FIG. 2 it is noticed that this clutch comprises a drive sleeve 25 and a concentric inner driven sleeve 26 separated by a cage 27 supporting rollers 28. Drive sleeve 25 is directly connected to drive 16 for continuous constant speed rotation throughout the operation of the machine. Inner drive sleeve 26 is operatively associated with clutch control 17 to transmit torque received by it from drive sleeve 25 by means of cage 27 and supported rollers 28 to clutch control 17. The inner surface of drive sleeve 25 is cylindrical whereas the outer surface of driven sleeve 26 is provided with flats 30 one for each of the rollers 28. The cage 27 holds these rollers in alignment. Extending from cage 27 in a direction towards clutch control 17 is a trip pin 31 which is engaged by an element of clutch control 17 to partially rotate cage 27 relative to drive sleeve 26 to move rollers 28 from their driving or wedged position between sleeve 26 and flats 30 to discontinue transmittal of torque from drive sleeve 25 to inner drive sleeve 26.

Clutch control 17 comprises essentially a pair of face plates 32 and 33 and a plurality of balls 34. Face plate 32 is secured to inner drive sleeve 26 for movement therewith and serves as the rotator for transmitting torque through balls 34 to face plate 33. Face plate 33 is secured to spindle 12 to drive spindle 12 when it is driven through balls 34 by face plate 32. Like all common ball and socket clutches balls 34 ride in sockets 32a and 33a in plates 32 and 33 respectively. Also face plate 33 is urged towards face plate 32 by a spring backing device 35 which commonly holds the plates together and which will permit separation of the plates by the balls 34 when, by excessive torque, they are forced out of the sockets 32a onto the face of plate 32. Clutch control 17 is completed by providing face plate 33 with a trouble pin 36 so aligned as to stop trip pin 31 when balls 34 are out of sockets 32a, as shown in FIG. 6. Plate 32 has a notch 37 in the periphery thereof through which trouble pin 36 extends to contact pin 31.

The device is completed by enclosing clutch 15 and clutch control 17 in a common housing 40 journaled in supporting structure 13 for rotation relative thereto and for rotation with drive 16, clutch 15, clutch control 17 and spindle 12. Housing 40 does not move axially relative to supporting structure 13. Thus, spindle 12, clutch 15, and control clutch 17 move axially of housing 40 when camming device 20a and 21a move drive sleeve 20 and inner shaft 21 in axial directions relative to each other and to support structure 13. This feature is used to reset clutch 15 and control clutch 17 after clutch 15 has been disengaged by control clutch 17 in a manner hereafter to be described. However, the structure which provides this feature includes radially extending reset pins 32p on face plate 32 and reset pins 33p on face plate 33 respectively, and a tapered slot 41 in housing 40. Reset pins 32p and 33p extend outwardly through tapered slot 41 which is wider. Tapered slot 41 is tapered in a direction such that reset pin 33p is permitted to have more rotation relative to housing 40 than face plate 32, and its reset pin 32p.

Operation

A complete cycle of operation will be described in connection with FIGURES 12 to 18 inclusive with reference to FIGURES 1 and 1a and the other figures in the drawing. At the start of the cycle clutch 15, and clutch control 17 are in driving position as illustrated in FIGURES 1a, 2, 3, 4, 7, and 12. Inner and outer fingers 14a and 14b are positioned relative to each other as illustrated in FIGURE 12. Throughout the cycle of operation drive 16 continues to rotate clutch 15 at a constant speed.

The next step in the cycle is effected by cams 20a and 21b causing simultaneous downward axial movement of drive sleeve 20 and inner shaft 21 to place collet 14 over and around a cap 10 as illustrated in FIG. 13 and then causing only drive sleeve 20 and its collet sleeve 14b to move downwardly relative to fingers 14a, so that fingers 14a are moved inwardly to grip the cap 10 as illustrated in FIGURES 1, 1a, and 14. In this position drive sleeve 20 and inner shaft 21 are both rotating, sleeve 20 being keyed to clutch control 17 (FIG. 1a), and inner and outer fingers 14a and 14b which now grip cap 10, cause the cap to spin with spindle 12.

The next step in the cycle is effected through cams 20a and 21a to raise drive sleeve 20 and cam 21a thereby lifting collet 14 and cap 10 gripped thereby as illustrated in FIG. 15 while drive 16 continues to rotate spindle 12 and cap 10 therewith so that a bottle 11 may be placed under the rotating cap 10 as illustrated in FIG. 15. After a bottle has been placed under collet 14, cam 20a and cam 21a cause collet 14 to be lowered simultaneously towards the bottle to place the rotating cap 10 against bottle 11 to start threading of the cap 10 onto threads 11t formed on the neck of bottle 11. This lowering operation continues and simultaneously therewith drive 16 continues to drive through clutch 15, clutch control 17, spindle 12, collet 14, and cap 10. Continued rotation causes cap 10 to thread itself onto bottle 11 until a predetermined torque has been reached, the predetermined torque being determined by a desired degree of tightening of cap 10 on bottle 11. As soon as cap 10 is tightened on bottle 11 the torque limit causes balls 34 to be forced out of sockets 32a thus discontinuing driving engagement between plate 33 and face plate 32. At this time face plate 32 is still rotating but face plate 33 has been stopped from rotating by the tightening of cap 10 on bottle 11.

Following this termination of torque transmission between face plates 32 and 33, face plate 32 continues to rotate until trip pin 31 on cage 27 abuts on trouble pin 36 on the stopped plate. The cage is thus stopped so that rollers 28 in the cage are backed away from their wedging engagement between cylindrical surface 29 and flats 30 and driving engagement between drive sleeve 25 and flats 30 on the sleeve 26 is broken and rotation of face plate 32 relative to plate 33 and cap 10 is also stopped. Thus it is apparent that clutch control 17 has controlled clutch 15 by causing clutch 15 to become disengaged so that it does not transmit torque from drive 16 to spindle 12, when a predetermined torque is applied to cap 10. The positions of the parts at this time and while the clutch 15, clutch control 17, face plate 32 and face plate 33 are disengaged from driving positions are illustrated in FIGURES 6, 8, and 9.

While thus disengaged inner drive sleeve 26 is not being driven, rotated or receiving torque from drive sleeve 25 so as to permit relative movement between drive sleeve 26 and cage 27 in a direction which will move rollers 28 to a wedging position between flats 30 and cylindrical surface 29 for transmission of torque from drive sleeve 25 to drive sleeve 26. A spring 45 (FIGURES 2, 4, and 5) is interconnected between drive sleeve 26 and cage 27 to serve as a bias to restore rollers 38 to a wedging or driving position between sleeve 25 and flats 30 on shaft 26 when the collet 14 is released from the tightened cap 10 and clutch control 17 is reset.

After clutch control 17 has disengaged clutch 15, by the bumping of trip pin 31 against trouble pin 36, clutch 15 will stay disengaged until control clutch 17 is reset by the upward axial motion of the spindle assembly 12, clutch 15, constant speed drive 16 etc. During this upward movement, reset pin 33p in plate 33 contacts cam face 41 in sleeve 40 and rotates plate 33 back relative to plate 32 until balls 34 are urged by spring 35 into sockets 32a. This movement also separates trouble pin 36 from trip pin 31 allowing spring 45 to rotate cage 27 carrying rollers 28 into the driving position illustrated in FIG. 4. This immediately establishes transmission of torque from drive sleeve 25, which is continually rotated by drive 16, through rollers 28 and to drive sleeve 26 and through torque control clutch 17 to spindle 12. In this rotation the path of driving torque is from drive 16 through drive sleeve 25 thence through rollers 28, cage 27, drive sleeve 26 through torque control clutch 17 and thus into spindle 12.

After clutch 15 and control clutch 17 have both released as above described, cap 10 remains stopped and drive sleeve 25 continues to rotate relative to spindle 12 until cam 20a moves collet sleeve 14b upwardly axially to disengage fingers 14a from cap 10 as illustrated in FIG. 17, after which cams 20a and 21a move the collet upwardly away from the cap as shown in FIG. 18. This relative axial movement between drive sleeve 20, inner shaft 21 and supporting structure 13 by cams 20a and 21a also results in an upward axial movement of reset pins 32p and 33p relative to housing 40. Continued movement of reset pins 32p and 33p relative to housing 40 and due to the camming action of tapered slot 41 on the reset pins, 32p and 33p trip pin 31 moved away from trouble pin 36 and balls 34 are repositioned in their sockets 32a. At this instant of the operation, the reset pins 32p and 33p, tapered slot 41, housing 40, balls 34, face plates 32 and 33 are in the position as illustrated in FIG. 10 and the collet is raised and positioned as in FIG. 18 thus completing the cycle of operation and putting the device at the beginning of another cycle of operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for applying and tightening screw caps on containers, said device comprising rotatable cap gripping means, driving means for rotating said gripping means, clutch means interposed between said gripping means and said driving means for disconnecting said driving and gripping means, said clutch means including a drive clutch having a trip pin extending axially from a drive element thereof, a control clutch driven by said drive clutch and having a second pin extending axially from a control element thereof and disposed in the path of said trip pin, said control clutch being adapted to slip when said cap gripping means is subjected to a predetermined torque whereupon said control element is stopped and said second pin thereon stops said trip pin and its drive element to disconnect said driving means from said gripping means, and means for resetting said control element whereby said pins are again separated and said driving and gripping means are reconnected so that said drive means, operating through said clutch means, again rotates said cap gripping means.

2. The device set forth in claim 1 wherein said drive element is a roller bearing cage disposed intermediate input and output members of said drive clutch and said relative movement of said cage by the engagement of said pins removes the rollers in said cage from their wedged and driving engagement between said input and output members.

3. The device set forth in claim 2 wherein said control element is the output member of said control clutch, said control output member being stopped immediately under said predetermined torque so that said trip pin collides with said stopped second pin on the control output member whereby said trip pin and said cage are moved backwardly relative to the input and output members of the drive clutch.

4. A device for applying and tightening screw caps on containers, said device comprising rotatable and vertically reciprocable cap gripping means, driving means for rotating said gripping means, clutch means interposed between said gripping means and said driving means for disconnecting said driving and gripping means when the latter is subjected to a predetermined torque, said clutch means including a drive clutch, a control clutch having a control element, and trip means intermediate said clutches and operable by said control element to disconnect said drive element when said control clutch is subjected to said predetermined torque, operating means for raising and lowering said gripping means and for moving said gripping means into gripping engagement against a said cap while applying the cap to a container, and to release said cap when said drive clutch is disconnected and rotation of said gripping means is thus stopped while the gripping means is in its lower position, and means for resetting said control element and trip means while said gripping means is raised by said operating means to its upper position, whereby said drive clutch is reconnected so that said cap gripping means is again rotated by said driving means.

5. The device set forth in claim 7 wherein said cap gripping means is a collet having inner fingers biased to release positions disposed radially outwardly from their gripping positions, and an outer member for moving said fingers radially inwardly to their cap gripping positions when said outer member is moved axially relative to said fingers by said operating means.

References Cited in the file of this patent

UNITED STATES PATENTS

| | | |
|---|---|---|
| 2,610,779 | Fouse | Sept. 16, 1952 |
| 2,966,973 | Hayes | Jan. 3, 1961 |
| 2,973,848 | Dixon | Mar. 7, 1961 |

FOREIGN PATENTS

| | | |
|---|---|---|
| 786,099 | Great Britain | Nov. 13, 1957 |